(12) United States Patent
Li et al.

(10) Patent No.: US 11,440,134 B2
(45) Date of Patent: Sep. 13, 2022

(54) METHOD OF JOINING DISSIMILAR METALS THROUGH FRICTION STIR WELDING AND MULTI-METAL COMPONENT

(71) Applicant: GM GLOBAL TECHNOLOGY OPERATIONS LLC, Detroit, MI (US)

(72) Inventors: Huaxin Li, Rochester Hills, MI (US); Dale A. Gerard, Bloomfield Hills, MI (US); Adam G. Kotlarek, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 16/448,482

(22) Filed: Jun. 21, 2019

(65) Prior Publication Data
US 2020/0398369 A1 Dec. 24, 2020

(51) Int. Cl.
*B23K 20/12* (2006.01)
*C22C 9/01* (2006.01)
*C22C 38/42* (2006.01)
*B62D 29/00* (2006.01)
*C22C 38/04* (2006.01)
*B62D 27/02* (2006.01)

(52) U.S. Cl.
CPC .......... *B23K 20/128* (2013.01); *B23K 20/129* (2013.01); *B62D 29/008* (2013.01); *C22C 9/01* (2013.01); *C22C 38/04* (2013.01); *C22C 38/42* (2013.01); *B62D 27/023* (2013.01)

(58) Field of Classification Search
CPC .................. B23K 20/128; C22C 9/01
USPC ........................................................ 403/272
See application file for complete search history.

(56) References Cited

U.S. PATENT DOCUMENTS 5,314,106 A * 5/1994 Ambroziak ............. F01D 5/025
228/114.5

OTHER PUBLICATIONS

U.S. Appl. No. 16/034,712, titled "Pretreatment of Weld Flanges to Mitigate Liquid Metal Embrittlement Cracking in Resistance Welding of Galvanized Steels," filed on Jul. 13, 2018 by GM Global Technology Operations LLC.
Friction Stir Welding of Aluminum To Copper—An Overview, Science Direct, Jan. 20, 2017, pp. 2113-2136, No. 27, Trans. Nonferrous Met. Soc. China, China.

* cited by examiner

*Primary Examiner* — Weiping Zhu
(74) *Attorney, Agent, or Firm* — Vivacqua Crane PLLC

(57) ABSTRACT

A component, which may be an automotive chassis structure, includes first and second sub-part main bodies. The first sub-part main body is formed of a first material, and the second sub-part main body is formed of a second material. The first material is a steel alloy, and the second material is aluminum or an aluminum alloy. A transition layer is attached to and contacts the first sub-part main body. The transition layer is formed of a third material, where the third material contains at least a majority of copper. A mixed layer is disposed between the transition layer and the second sub-part main body, and the mixed layer is formed of a mixture of the second material and the third material. A disclosed method includes forming the component by friction stir welding the transition layer to the second sub-part main body.

8 Claims, 4 Drawing Sheets

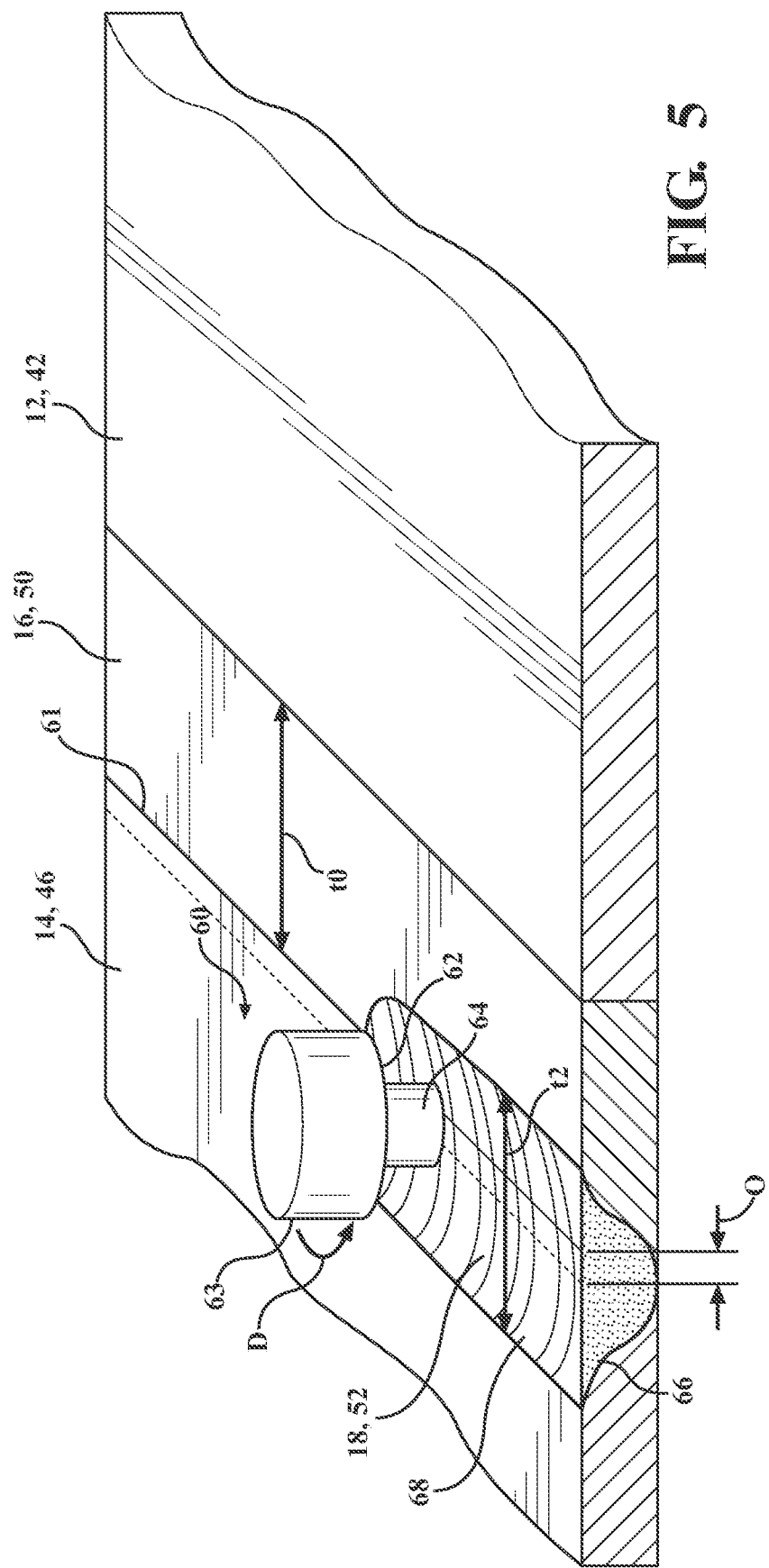

METHOD OF JOINING DISSIMILAR METALS THROUGH FRICTION STIR WELDING AND MULTI-METAL COMPONENT

FIELD

The present disclosure relates to an automotive component formed of dissimilar metallic materials and a method of joining multiple sub-parts to form the automotive component.

INTRODUCTION

Automotive chassis components are typically formed of steel. Automotive manufacturers desire to reduce overall weight within a vehicle, and therefore, many aluminum components have been proposed, but components must be able to meet performance standards. As such, lightweight metals, such as aluminum, may not be suitable alone to use for a chassis structure, because the aluminum may not provide adequate strength and/or wear resistance. Although it would seem desirable to use aluminum for parts of the chassis structure and steel for other parts based on requirements, steel and aluminum have been difficult to join together because welding aluminum and steel often forms undesirable intermetallic compounds at the joined interface, which may result in break-off of the steel from the aluminum. Bolts may be used to join aluminum and steel chassis cradle parts together, but this adds cost, weight, space, and manufacturing complexity. Accordingly, there is a need for lightweight components that meet wear resistance and strength requirements, which are cost effective and without adding manufacturing complexity.

SUMMARY

The present disclosure provides a component, such as a chassis structure, that includes mixed metal sub-parts joined together. The sub-parts include a steel part and an aluminum or aluminum alloy part. A copper or copper alloy layer is attached to the steel, and then the copper/copper alloy layer and the aluminum component are joined together. The copper/copper alloy layer and the aluminum component may be joined together by friction stir welding to reduce undesirable intermetallics at the joined surface.

In one form, which may be combined with or separate from the other components disclosed herein, a method of joining dissimilar metals is provided. The method includes providing a first component formed of a steel alloy and disposing a transition layer onto the first component. The transition layer is formed of copper and/or a copper alloy. The method further includes providing a second component formed of aluminum or an aluminum alloy and disposing the second component adjacent to the transition layer so that the transition layer is disposed between the first component and the second component. The method includes friction stir welding the transition layer to the second component.

In another form, which may be combined with or separate from the other forms disclosed herein, a component is provided that includes a first sub-part main body formed of a first material and a second sub-part main body formed of a second material. The first material is a steel alloy, and the second material is aluminum or an aluminum alloy. A transition layer is attached to and contacts the first sub-part main body. The transition layer is formed of a third material, where the third material contains at least a majority of copper. A mixed layer is disposed between the transition layer and the second sub-part main body, where the mixed layer is formed of a mixture of the second material and the third material.

In yet another form, which may be combined with or separate from the other forms disclosed herein, an automotive chassis structure is provided that includes a first cradle formed of a first material and having a plurality of first cradle distal ends and second cradle formed of a second material and having a plurality of second cradle distal ends. The first material is a steel alloy, and the second material is aluminum or an aluminum alloy. A transition layer is attached to and contacts each first cradle distal end. The transition layer is formed of a third material, where the third material contains at least a majority of copper. A mixed layer is disposed between each transition layer and each second cradle distal end. The mixed layer is formed of a mixture of the second material and the third material.

Additional features may be provided, including but not limited to the following: attaching the transition layer onto the first component, the first sub-part main body, or the first cradle distal end via laser cladding; the transition layer having a thickness in the range of 5 to 20 millimeters; the mixed layer having a thickness in the range of 3 to 20 millimeters; each of the first and second sub-part main bodies having a thickness in the range of 3 to 10 millimeters; the transition layer having a base layer disposed on the first component or first sub-part main body and an outer layer disposed on the base layer; the base layer being substantially formed of copper, or formed of at least a majority of copper; the outer layer being formed of, or substantially formed of, an alloy containing copper, aluminum, and tin; and the steel alloy being HSLA 340, HSLA 420, and/or HSLA 550.

The steel alloy may optionally be provided comprising copper, manganese, chromium, nickel, vanadium, and/or niobium. These elements may be provided in the following amounts within the steel alloy, with the balance of the steel alloy being iron: 0-0.4 weight percent copper; 0-1.5 weight percent manganese; 0-1.5 weight percent chromium; 0-2.00 weight percent nickel; 0-0.4 weight percent vanadium; and/or 0-0.4 weight percent niobium.

The transition layer may be provided as a pure copper or a copper alloy containing, for example, copper, aluminum, iron, nickel, manganese, zinc, and/or tin. If included, these elements may be provided in the following amounts, with the balance being copper: 0-10 weight percent aluminum; 0-6 weight percent iron; 0-6 weight percent nickel; 0-2 weight percent manganese; and 0-0.5 weight percent zinc. Tin may be provided in any desirable amount to create a copper-bronze layer. In some forms, the copper alloy contains at least 75 weight percent copper.

In some variations, the first and second components (or first and second sub-part main bodies) are attached via a butt joint. As such, the surface areas of the sides of the components are greater than the surface areas of the ends that are joined together via the butt joint. For example, the first component (or first sub-part main body) may have a plurality of first component sides (or first sub-part sides) and a first component distal end (or first sub-part main body distal end) connecting the plurality of first component sides (or first sub-part sides). Each first component side (or each first sub-part side) may have a greater surface area than a surface area of the first component distal end (or first sub-part main body distal end). Likewise, the second component (or second sub-part main body) may have a plurality of second component sides (or second sub-part sides) and a second component distal end (or second sub-part main body distal end) connecting the plurality of second component sides (or second sub-part sides). Each second component side (or second sub-part side) has a greater surface area than a surface area of the second component distal end (or second sub-part main body distal end). The transition layer may be disposed onto the first component distal end (or first sub-part main body distal end). In this example, the first component distal end (or first sub-part main body distal end) abuts the second component distal end (or second sub-part main body distal end) with the transition layer disposed between the first component distal end (or first sub-part main body distal end) and the second component distal end (or second sub-part main body distal end). The transition layer and the mixed layer are disposed between the first sub-part main body distal end and the second sub-part main body distal end.

The above features and advantages, and other features and advantages, of the present invention are readily apparent from the detailed description, including the claims, and exemplary embodiments when taken in connection with the accompanying drawings. It should be understood that the detailed description and specific examples are intended for purposes of illustration only and are not intended to limit the scope of the disclosure.

BRIEF DESCRIPTION OF THE DRAWINGS

The drawings described herein are for illustration purposes only and are not intended to limit the scope of the present disclosure in any way.

FIG. 5 is a perspective view illustrating a friction stir welding step of the method of FIG. 4, in accordance with the principles of the present disclosure.

DETAILED DESCRIPTION

Figure 1A:
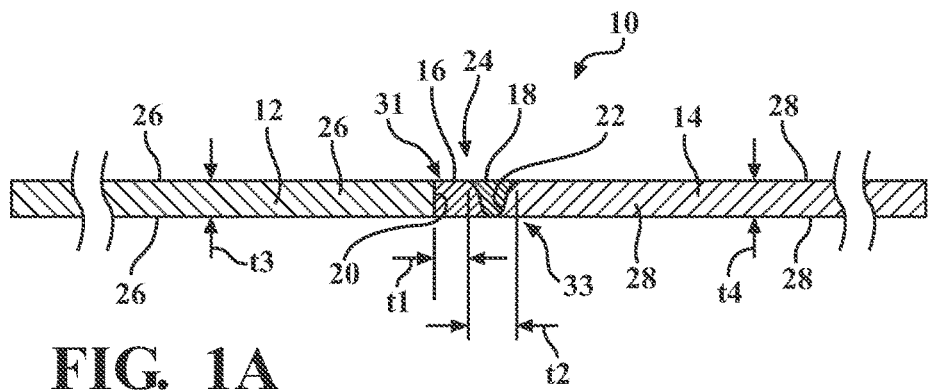
FIG. 1A is a cross-sectional view of a component including a transition layer, in accordance with the principles of the present disclosure.
Figure 1B:
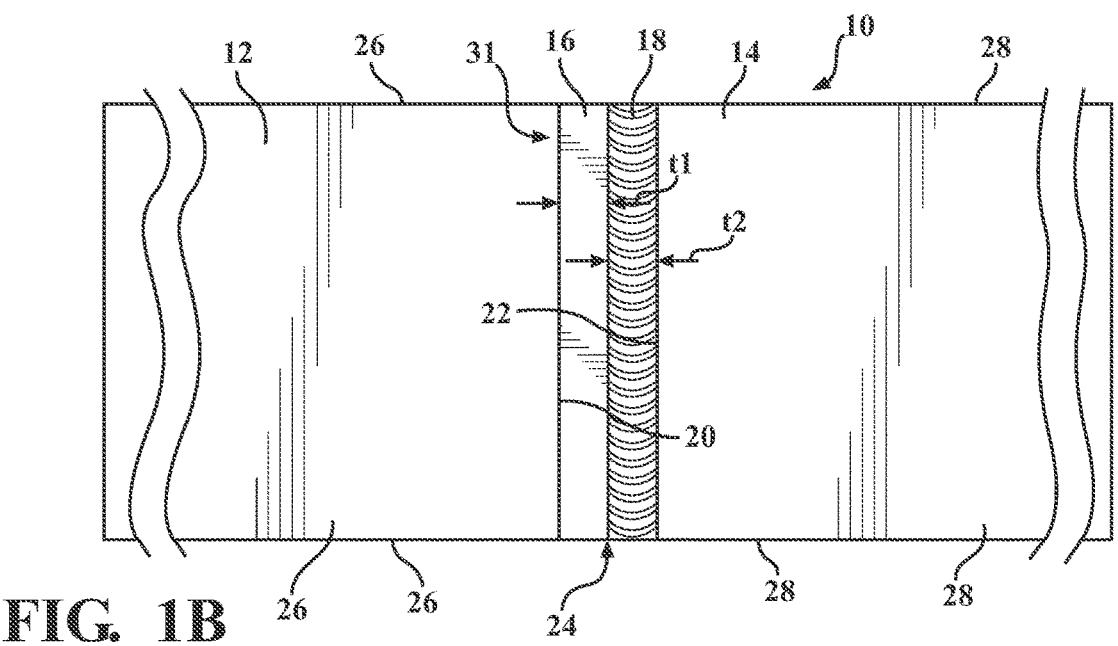
FIG. 1B is a plan view of the component of FIG. 1A, according to the principles of the present disclosure.

Referring now to the drawings, wherein like numerals represent like elements, a component is provided and generally indicated at 10 in FIGS. 1A and 1B. The component 10 may be, for example, an automotive component, such as a chassis structure or frame. The component 10 includes a first sub-part main body 12 joined to a second sub-part main body 14. The first sub-part main body 12 is formed of a steel alloy, and the second sub-part main body is formed of either pure aluminum or an aluminum alloy.

A transition layer 16 is attached to and contacts the first sub-part main body 12. The transition layer 16 is added to the first sub-part main body 12 to aid in joining the first sub-part main body 12 to the second sub-part main body 14. To this end, the transition layer 16 is formed of copper and/or a copper alloy. The transition layer 16 may be laser clad to the first sub-part main body 12, which will be described in further detail below.

When assembled together as show in FIGS. 1A-1B, the component 10 includes a mixed layer 18 disposed between the transition layer 16 and the second sub-part main body 14. The mixed layer 18 is formed of a mixture of the material of the transition layer 18 and the material of the second sub-part main body 14. The mixed layer 18 may be created by friction stir welding the transition layer 16 to the second sub-part main body 14, as will be described in greater detail below.

In the illustrated example, the transition layer 16 may have a thickness t1 along a first side 31 of the component 10 in the range of 5 to 20 millimeters, and the mixed layer 18 may have a thickness t2 along the first side 31 in the range of 3 to 20 millimeters, by way of example. Since the mixed layer 18 may be a stir region or nugget created by a friction stir welding process (which will be described in greater detail below), the thickness of the mixed layer 18, and therefore the thickness of the transition layer 16 generally varies along their depths. For example, at the second side 33 of the component 10, the mixed layer 18 has a lesser thickness than its thickness along the first side 31, and conversely, the transition layer 16 is thicker at the second 33 than its thickness t1 at the first side 31; this is because the nugget decreases in size along the depth of the component 10 away from the surface 31 along which the friction stir welding occurred.

The transition layer 16 and the mixed layer 18 are disposed between ends 20, 22 of each of the first and second sub-part main bodies 12, 14, respectively. Each of the first and second sub-part main bodies 12, 14 may have any desirable thickness, length, and width. In one example, the first and second sub-part main bodies have thicknesses t3, t4, respectively, in the range of 3 to 10 millimeters each.

In the illustrated example, a butt joint 24 is formed between the first and second sub-part main bodies, with the aid of the transition layer 16 that forms part of the mixed layer 18 between the transition layer 16 and the second sub-part main body 18. The butt joint 24 joins the ends 20, 22 of the sub-part main bodies 12, 14 through the transition layer 16 and the mixed layer 18. The end 20 of the first sub-part main body 12 connects each of the sides 26 of the first sub-part main body 12, and similarly, the end 22 of the second sub-part main body 14 connects each of the sides 28 of the second sub-part main body 14. In some examples, each side 26 of the first sub-part main body 12 has a greater surface area than the surface area of the distal end 20; and each side 28 of the second sub-part main body 14 has a greater surface area than the surface area of the distal end 22.

As stated above, the first sub-part main body 12 is formed of a steel alloy. Any number of different steel alloys could be selected. By way of nonlimiting example, the steel alloy could include one or more of the following, or be formed solely of one or more of the following: HSLA 340, HSLA 420, or HSLA 550. In one variation, the steel alloy could comprise iron and one or more of the following alloying elements: copper, manganese, chromium, nickel, vanadium, and/or niobium. However, it should be understood that other alloying elements could be included in the steel alloy without falling beyond the spirit and scope of the present disclosure. In some examples, the steel alloy may contain iron and one or more of the following elements in these weight percentages: 0-0.4 weight percent copper; 0-1.5 weight percent manganese; 0-1.5 weight percent chromium; 0-2.00 weight percent nickel; 0-0.4 weight percent vanadium; and/or 0-0.4 weight percent niobium.

The second sub-part main body is formed of a pure, unalloyed aluminum or any desirable aluminum alloy. For example, if alloyed, the aluminum alloy may include at least 85 weight percent aluminum. The unalloyed aluminum or aluminum alloy sub-part main body 14 may be either coated or uncoated. Some notable aluminum alloys that may constitute the coated or uncoated aluminum part are an aluminum-magnesium alloy, an aluminum-silicon alloy, an aluminum-magnesium-silicon alloy, and an aluminum-zinc alloy.

The transition layer 16 is formed of a material containing copper, such as pure, unalloyed copper or a copper alloy. A copper alloy used in the transition layer 16 may include, by way of example: 0-10 weight percent aluminum; 0-6 weight percent iron; 0-6 weight percent nickel; 0-2 weight percent manganese; 0-0.5 weight percent zinc; and the balance copper.

Figure 2:
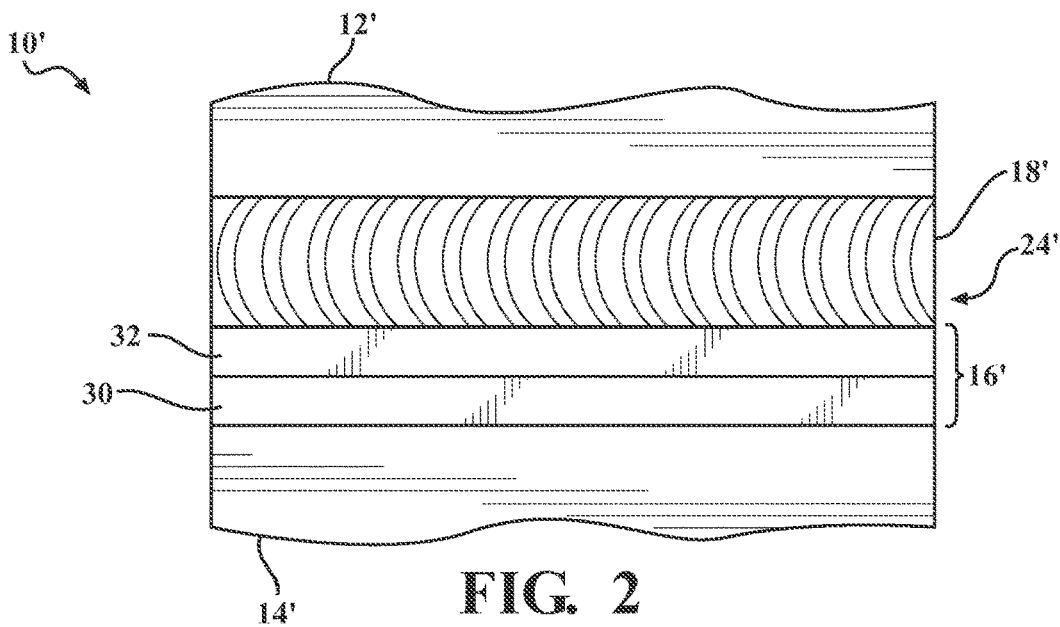
FIG. 2 is a cross-sectional view of another variation of a component having a multi-layer transition layer, in accordance with the principles of the present disclosure.

Referring now to FIG. 2, another variation of a component is illustrated and generally designated at 10'. It should be understood that, unless described as being different than the component 10 described above and shown in FIGS. 1A-1B, the component 10' may be the same of the component 10 described above. For example, the components 10' has a first sub-part main body 12' joined to a second sub-part main body 14' through a transition layer 16' and a mixed layer 18', such that a butt joint 24' is formed between the first and second sub-part main bodies 12', 14'.

In the example of FIG. 2, however, the transition layer 16' includes a base layer 30 disposed in contact with the first sub-part main body 12' and an outer layer 32 disposed on the base layer 30. The base layer 30 may be formed, or substantially formed, of pure unalloyed copper, or the base layer 30 may be formed of any of the variations of copper alloys described above, or of other copper alloys. The outer layer 32 may be formed, or substantially formed, of a copper-bronze alloy containing copper, aluminum, and tin. In the alternative, the outer layer 32 may be formed of another copper alloy, such as a copper-aluminum alloy. In the illustrated example, the addition of tin creates a copper-bronze alloy, which assists the outer layer 32 in bonding well to the aluminum part 14' through the mixed layer 18', where the mixed layer 18' contains both the aluminum from the part 14' and the copper-bronze alloy from the outer layer 32.

Figure 3A:
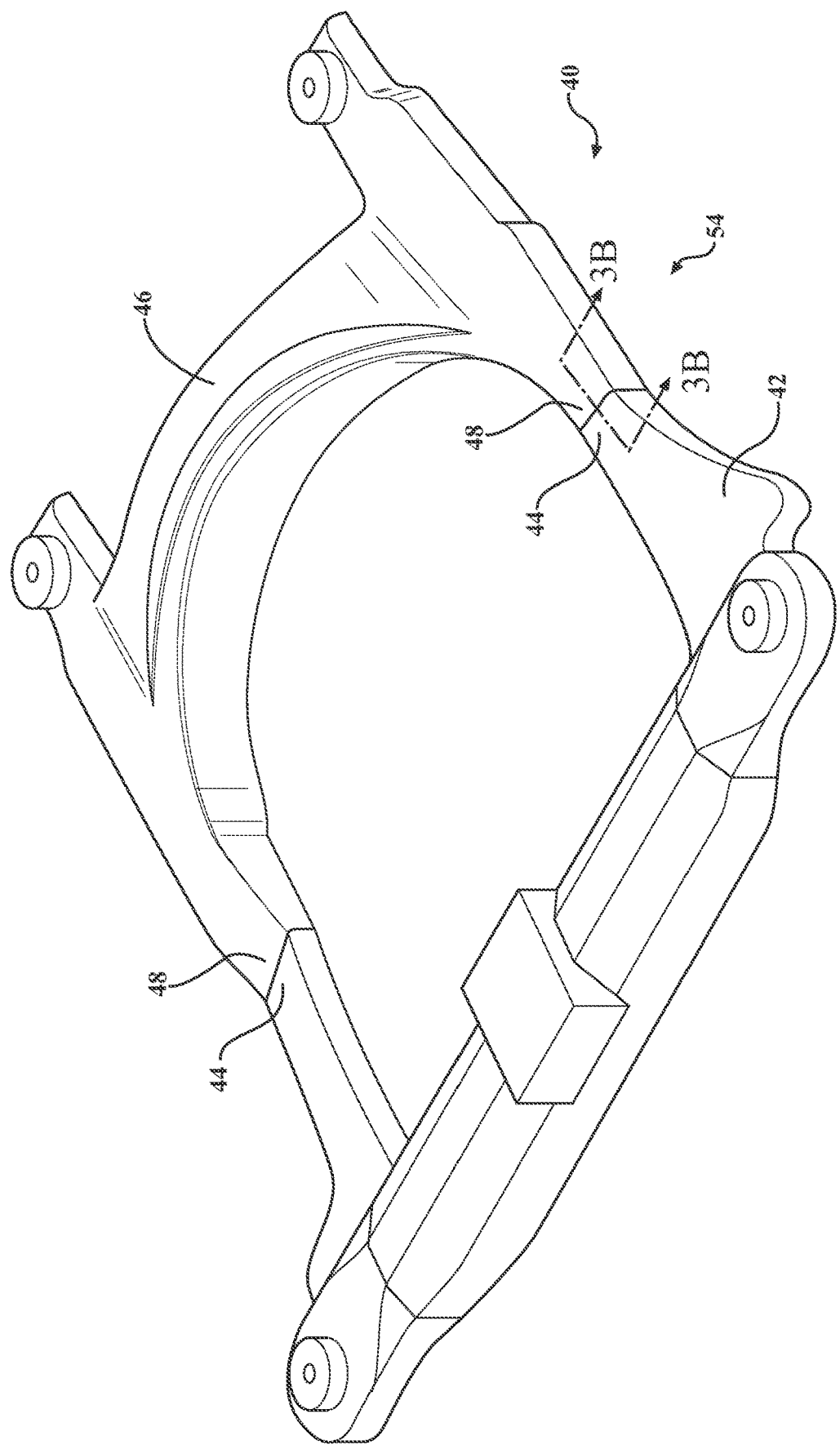
FIG. 3A is a perspective view of a chassis structure, according to the principles of the present disclosure.
Figure 3B:
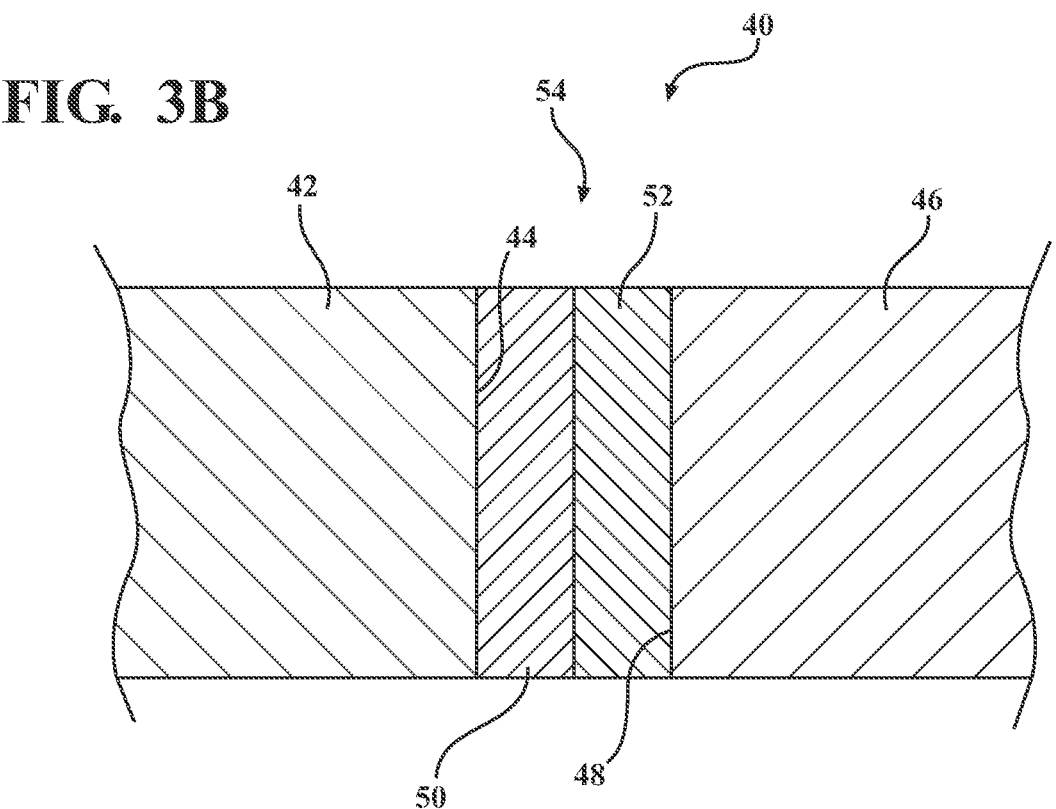
FIG. 3B is a cross-sectional view of the chassis structure of FIG. 3A, taken along the lines 3B-3B, in accordance with the principles of the present disclosure.

Referring now to FIGS. 3A and 3B, an automotive chassis structure is illustrated and generally designated at 40. The automotive chassis structure 40 includes a first cradle 42 formed of a steel alloy and having a plurality of first cradle distal ends 44 and a second cradle 46 formed of aluminum or an aluminum alloy and having a plurality of second cradle distal ends 48.

Like the component 10 illustrated in FIGS. 1A-1B, a transition layer 50 is attached to and contacts each first cradle distal end 44 of the plurality of first cradle distal ends 44. Similarly too, a mixed layer 52 is disposed between each transition layer 50 and each second cradle distal end 48 of the plurality of second cradle distal ends 48. A butt joint 54 is formed between the cradle distal ends 44, 48 through the transition layer 50 and the mixed layer 52. The details described above with respect to the component 10 may apply equally to the chassis structure 40. For example, the mixed layer 52 may be formed of a mixture of the material from the second cradle 46 and from the material of the transition layer 50, and the transition layer 50 may be formed of copper and/or a copper alloy, as described above. Likewise, the transition layer 50 may be laser clad to each first cradle distal end 44.

Figure 4:
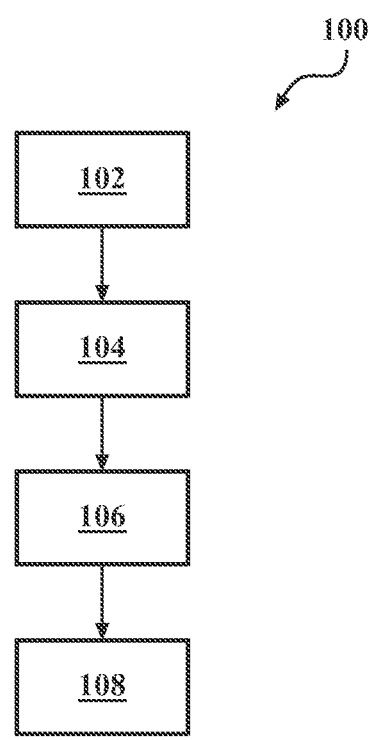
FIG. 4 is a block diagram illustrating a method of joining dissimilar metals, in accordance with the principles of the present disclosure.

Referring now to FIGS. 4 and 5, FIG. 4 shows a block diagram of a method 100 of joining dissimilar materials, which may be used to create a multi-metal object, such as the component 10 or the chassis structure 40. FIG. 5 shows a schematic illustration of a friction stir welding step that is performed as part of the method 100.

The method 100 includes a step 102 of providing a first component formed of a steel alloy, such as the first sub-part main body 12 or the first chassis cradle 42. The method 100 then includes a step 104 of disposing a transition layer onto the first component 12, 42, where the transition layer is formed of at least one of the following: copper and a copper alloy. This step 104 may include attaching the transition layer onto the first component via laser cladding. If laser cladding is used, a laser beam is used to melt powder or wire metallic material so that the material adheres to the component 12, 42. In this case, the copper or copper alloy may be supplied as a powder metal by a laser beam to laser clad the copper or copper alloy to the steel alloy first component 12, 42. More particularly, a laser source may be provided to apply a laser beam to powder metal being dispensed from a nozzle, to deposit the powder metal onto the first component 12, 42. The laser beam from the laser source may be applied directly or indirectly to the powder metal, to result in a metal coating adhered to the first component, which is firmly bonded directly to the first component. Preferably, the bond between the laser clad transition layer 16, 50 and the first component 12, 42 is a metallurgical bond.

While the present disclosure generally describes the use of a laser source to apply the powder to adhere the transition layer 16, 50 onto the first component 12, 42, it should be understood that other apparatuses may be used to cause deposition of the powders, such as an electron beam. In another alternative, the transition layer 16, 50 may be provided in the form of wires, instead of powder, or the transition layer 16, 50 may be applied onto the first component 12, 42 in any other desirable way.

The method 100 also includes a step 106 of providing a second component formed of aluminum or an aluminum alloy and disposing the second component adjacent to the transition layer so that the transition layer is disposed between the first component and the second component. The second component may be the second sub-part main body 14 or the second cradle 46, by way of example, having the make-up and characteristics described above.

The method 100 then includes a step 108 of friction stir welding the transition layer to the second component. For example, referring to FIG. 5, a tool 60 is rapidly rotated along an interface 61 between the transition layer 16, 50 and the second component 14, 46. The tool 60 forms a round shoulder 63 having a face 62 and a pin 64 disposed in the center of the face 62 and extending from the face 62. Though not shown, the pin 64 may have a tapered and threaded configuration. The tool 60 is rapidly rotated to move the face 62 along the interface 61 to create a stir region, referred to as the mixed layer 18, 52 in the above-referenced description. The stir region comprises metal from both the copper/copper alloy transition layer 16, 50 and the aluminum component 14, 46 within the weld nugget 66 of the stir region, and an onion-like pattern 68 is formed on the surface of the mixed layer 18 along the trailing edge of the tool 60 as the tool 60 is advanced linearly along the interface 61 while being rotated in the direction D indicated.

In some examples, the tool 60 may be rotated at a speed of about 600-1200 rotations per minute and advanced along the interface 61 with an axial speed of about 50-70 millimeters per minute. The face 62 may have a slight tilt, such as a tilt of about 2 degrees, against the surface of the component 10. The pin 64 may be slightly offset from the interface 61, to create an offset distance O between the center of the pin 64 and the interface 61. The offset distance O could be, for example, 0.5-3 millimeters. While the transition layer 16, 50 may have an initial thickness t0 in the range of 5 to 20 millimeters, the shoulder 63 could have a diameter in the range of 8-20 mm, to create the mixed layer 18, 50 having a thickness t2 equal to the diameter of the shoulder 63.

It should be understood that any of the variations described herein may be used alone or in combination. For example, the transition layer that is laser clad onto the steel component may include multiple layers, such as shown and described with respect to FIG. 2.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of joining dissimilar metals, the method comprising:
   providing a first component formed of a steel alloy;
   disposing a transition layer onto the first component, the transition layer having a base layer disposed on the first component and an outer layer disposed on the base layer, the base layer being substantially formed of copper, and the outer layer being substantially formed of an alloy containing copper, aluminum, and tin;
   providing a second component formed of aluminum or an aluminum alloy and disposing the second component adjacent to the transition layer so that the transition layer is disposed between the first component and the second component; and
   friction stir welding the transition layer to the second component.

2. The method of claim 1, further comprising attaching the transition layer onto the first component via laser cladding.

3. The method of claim 2, further comprising providing the transition layer having a thickness in the range of 5 to 20 millimeters.

4. The method of claim 1, further comprising providing the steel alloy as a steel alloy selected from the group consisting of: HSLA 340, HSLA 420, and HSLA 550.

5. The method of claim 1, further comprising providing the steel alloy comprising:
   copper in an amount not exceeding 0.4 weight percent;
   manganese in an amount not exceeding 1.5 weight percent;
   chromium in an amount not exceeding 1.5 weight percent;
   nickel in an amount not exceeding 2.00 weight percent; and
   at least one of vanadium and niobium in amounts not exceeding 0.4 weight percent each.

6. The method of claim 1, further comprising providing the base layer comprising:
   aluminum in an amount not exceeding 10 weight percent;
   iron in an amount not exceeding 6 weight percent; and
   at least 75 weight percent copper.

7. The method of claim 6, further comprising providing the base layer comprising:
   nickel in an amount not exceeding 6 weight percent;
   manganese in an amount not exceeding 2 weight percent; and
   zinc in an amount not exceeding 0.5 weight percent.

8. The method of claim 1, further comprising providing the first component having a plurality of first component sides and a first component distal end connecting the plurality of first component sides, each first component side of the plurality of first component sides having a greater surface area than a surface area of the first component distal end, and the second component having a plurality of second component sides and a second component distal end connecting the plurality of second component sides, each second component side of the plurality of second component sides having a greater surface area than a surface area of the second component distal end, the step of disposing the transition layer onto the first component comprising disposing the transition layer onto the first component distal end, the first component distal end abutting the second component distal end with the transition layer disposed between the first component distal end and the second component distal end.

* * * * *